United States Patent
Patricelli et al.

(10) Patent No.: US 11,885,353 B2
(45) Date of Patent: Jan. 30, 2024

(54) JET FAN AND VEHICLE COMPRISING SUCH A FAN

(71) Applicant: LEONARDO S.P.A., Rome (IT)

(72) Inventors: Luca Patricelli, Samarate (IT); Sebastiano Felice, Samarate (IT)

(73) Assignee: LEONARDO S.P.A., Rome (IT)

( * ) Notice: Subject to any disclaimer, the term of this patent is extended or adjusted under 35 U.S.C. 154(b) by 348 days.

(21) Appl. No.: 17/415,276

(22) PCT Filed: Nov. 28, 2019

(86) PCT No.: PCT/IB2019/060287
§ 371 (c)(1),
(2) Date: Jun. 17, 2021

(87) PCT Pub. No.: WO2020/136474
PCT Pub. Date: Jul. 2, 2020

(65) Prior Publication Data
US 2022/0056917 A1    Feb. 24, 2022

(30) Foreign Application Priority Data
Dec. 24, 2018  (EP) ..................................... 18215862

(51) Int. Cl.
*F04F 5/16*     (2006.01)
*B64C 27/04*    (2006.01)
(Continued)

(52) U.S. Cl.
CPC ................ *F04F 5/16* (2013.01); *B64C 27/04* (2013.01); *B64D 13/00* (2013.01); *F04F 5/46* (2013.01); *F04D 25/08* (2013.01)

(58) Field of Classification Search
CPC .......... F04F 5/16; F04F 5/42; F04F 5/46–466; F04F 5/54; B64C 27/04; B64D 13/00; F04D 25/08
(Continued)

(56) References Cited

U.S. PATENT DOCUMENTS 467,427 A * 1/1892 McClave ................ F04F 5/466
                                                    417/179
749,050 A * 1/1904 Fraser ..................... F04F 5/466
                                                    417/179
(Continued)

FOREIGN PATENT DOCUMENTS

CN      102 251 994       11/2011
CN      102251994 A   *   11/2011
(Continued)

*Primary Examiner* — Alexander B Comley
(74) *Attorney, Agent, or Firm* — Leason Ellis LLP

(57) ABSTRACT

A fan is described with a first conveying element, fluidly connectable with a source of a primary air flow and defining a first passage for the primary air flow; a first mouth receiving a first aliquot of the primary air flow from the first passage; a first Coanda surface onto which the first mouth directs the first aliquot; and a first opening fluidly connected with the first mouth and crossable by the first aliquot coming of the first mouth and a secondary air flow; the fan comprises a second conveying element, fluidly connected with the first conveying element and defining internally a second passage for a second aliquot of the primary air flow, and comprises: a second mouth receiving the second aliquot from the second passage and a second Coanda surface onto which the second mouth directs the second aliquot.

16 Claims, 7 Drawing Sheets

(51) Int. Cl.
*F04F 5/46* (2006.01)
*B64D 13/00* (2006.01)
*F04D 25/08* (2006.01)

(58) Field of Classification Search
USPC .......................................... 417/176, 177, 179
See application file for complete search history.

(56) References Cited

U.S. PATENT DOCUMENTS

| | | | | |
|---|---|---|---|---|
| 2,488,467 | A | * | 11/1949 | Di Lisio ................. F04D 25/08 239/561 |
| 3,047,208 | A | * | 7/1962 | Coanda ..................... F04F 5/16 417/174 |
| 3,795,367 | A | * | 3/1974 | Mocarski ............. B05B 7/0416 417/198 |
| 3,819,134 | A | * | 6/1974 | Throndson .......... B64C 29/0041 180/117 |
| 3,885,891 | A | * | 5/1975 | Throndson .............. F04F 5/466 417/196 |
| 4,037,991 | A | * | 7/1977 | Taylor ..................... F04F 5/466 417/89 |
| 4,332,529 | A | * | 6/1982 | Alperin ..................... F02K 1/36 417/198 |
| 4,448,354 | A | * | 5/1984 | Reznick .................. B64C 29/00 239/265.17 |
| 6,308,740 | B1 | | 10/2001 | Smith et al. |
| 8,356,804 | B2 | | 1/2013 | Fitton et al. |
| 8,985,966 | B2 | * | 3/2015 | Sampson ................. F04F 5/466 454/71 |
| 10,029,800 | B2 | * | 7/2018 | Moscatelli ............. B64D 13/08 |
| 2015/0218963 | A1 | * | 8/2015 | Alecu ..................... F01D 25/14 415/144 |
| 2018/0016017 | A1 | * | 1/2018 | daSilva ................... F04F 5/20 |
| 2018/0223876 | A1 | | 8/2018 | Martin et al. |
| 2018/0312262 | A1 | | 11/2018 | Wiegers et al. |

FOREIGN PATENT DOCUMENTS

| | | | |
|---|---|---|---|
| CN | 103 629 086 | 3/2014 | |
| CN | 107 044 0453 | 8/2017 | |
| FR | 3 033 372 | 9/2016 | |
| GB | 468 667 | 7/1937 | |
| GB | 2482548 A | * 2/2012 | ......... F04D 15/0218 |
| JP | 3213021 U | * 10/2017 | ............ F04D 25/08 |

* cited by examiner

US 11,885,353 B2

JET FAN AND VEHICLE COMPRISING SUCH A FAN

CROSS-REFERENCE TO RELATED APPLICATIONS

This patent application is a U.S. National Phase Application under 35 U.S.C. § 371 of International Patent Application No. PCT/IB2019/060287, filed on Nov. 28, 2019, which claims priority from European patent application no. 18215862.6 filed on Dec. 24, 2018, all of which are incorporated by reference, as if expressly set forth in their respective entireties herein.

TECHNICAL FIELD

The present invention relates to a fan.

The present invention also relates to a vehicle comprising such fan.

The term vehicle means in the present description an aircraft, naval or railway vehicle and more generally any moving object.

Preferably, the vehicle is an aircraft.

BACKGROUND ART

Fans commonly referred to as "bladeless", are known, for example from the application EP-B-2191142, comprising essentially:

a drive motor rotating a fan so as to create a primary air flow; and an annular conveying duct fluidly connected with the fan and defining a central opening.

The conveying duct comprises an interior passage for a primary flow of air generated by the fan, an annular mouth, and a Coanda surface also annular and adjacent to the mouth.

More precisely, the conveying duct comprises a radially inner wall and a radially outer wall defining the annular mouth.

The annular mouth has a tapered shape towards an outlet of the conveying duct delimited by the radially inner wall and the radially outer wall.

The Coanda surface is arranged so that the primary air flow coming out of the annular mouth is directed onto said Coanda surface.

The primary air flow generates a depression at the suction section of the fan, amplified by the Coanda effect and generating a secondary air flow, which is entrained by the primary air flow especially from the outlet area.

This secondary air flow crosses the central opening of the conveying duct and is added to the primary air flow thus increasing the total air flow moved by the fan.

According to the teaching of EP-B-219142, the fan is intended for a domestic application and the suction cross-section of the fan and, therefore of the primary flow, and the delivery cross-section of said fan are defined in the same environment.

Thus, the mechanical energy of the fan substantially results in only one kinetic energy increase of the primary and secondary air flow.

The need to raise the head of the fan described above is felt in the sector, in order to enable it to convey the primary and secondary flows between two distinct environments at respective different pressure levels from each other.

This is in order to make the aforementioned fan suitable to be implemented on an aircraft where there are environments at different pressure values.

The need to optimise the fluidodynamic behaviour of the primary air flow upstream of the outlet mouth of the conveying duct is also felt in the sector, in order to improve the efficiency and silence of said fan.

With regard to the aeronautical sector, traditional type fans are used in a large number of applications such as cooling electronic equipment, the engine and the transmission.

More specifically, in the aeronautical sector, the need is felt to reduce the risk of fan failure which may result in the loss of components.

In fact, such failures could have a direct impact on the flight safety of the aircraft, as a result of the fact that fragments projected at high-speed could damage the aircraft equipment, or on account of overheating of the ventilated equipment.

Alternatively, in the aeronautical sector, jet pumps are used instead of traditional fans.

However, these jet pumps have a non-negligible noise level and sub-optimal efficiency.

The need is therefore felt in the aeronautical sector to have fans easy to install in the aforesaid applications and characterised by low vibration and noise levels, high levels of safety and reliability, and of limited weight, cost and consumption.

This is in order to reduce the vibration and noise levels to which passengers are exposed in the cabin, to improve the payload of the aircraft and to reduce the pollution levels generated by the aircraft itself.

U.S. Pat. Nos. 2,488,467, 3,795,367, 3,885,891, 8,356,804 and US-A-2018/0223876 describe known types of fans.

U.S. Pat. No. 3,047,208 discloses a fan according to the preamble of claim 1.

DISCLOSURE OF INVENTION

The object of the present invention is to make a fan, which satisfies at least one of the aforementioned requirements in a simple and economical manner.

The above object is achieved by the present invention, insofar as it relates to a fan according to claim 1.

The present invention also relates to a vehicle according to claim 13.

BRIEF DESCRIPTION OF THE DRAWINGS

For a better understanding of the present invention, a preferred embodiment is described below, by way of a non-limiting example and with reference to the attached drawings, in which.

BEST MODE FOR CARRYING OUT THE INVENTION

Figure 1:
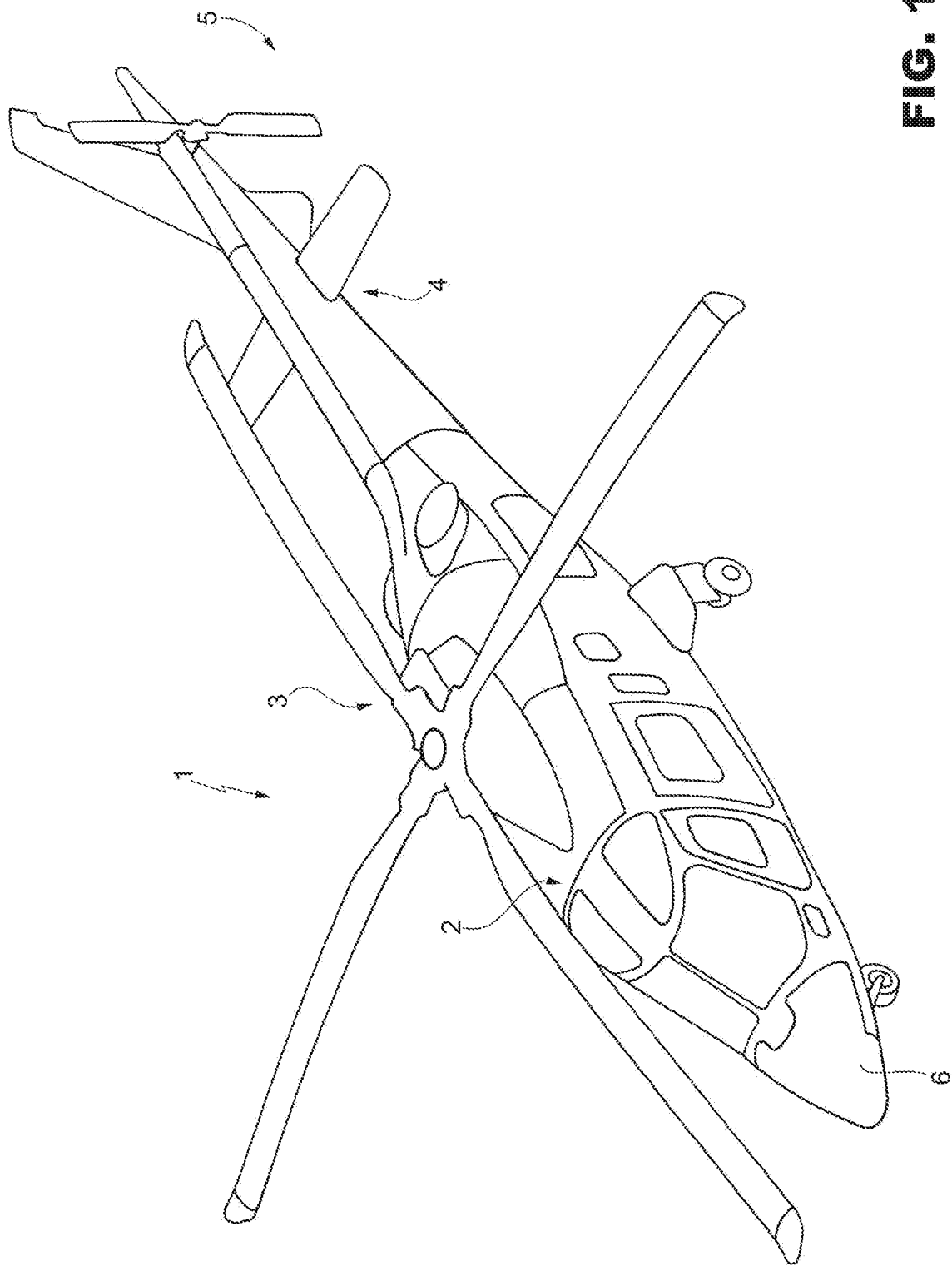
FIG. 1 is a perspective view of a vehicle, such as a helicopter, incorporating a fan according to the dictates of the present invention.
Figure 3:
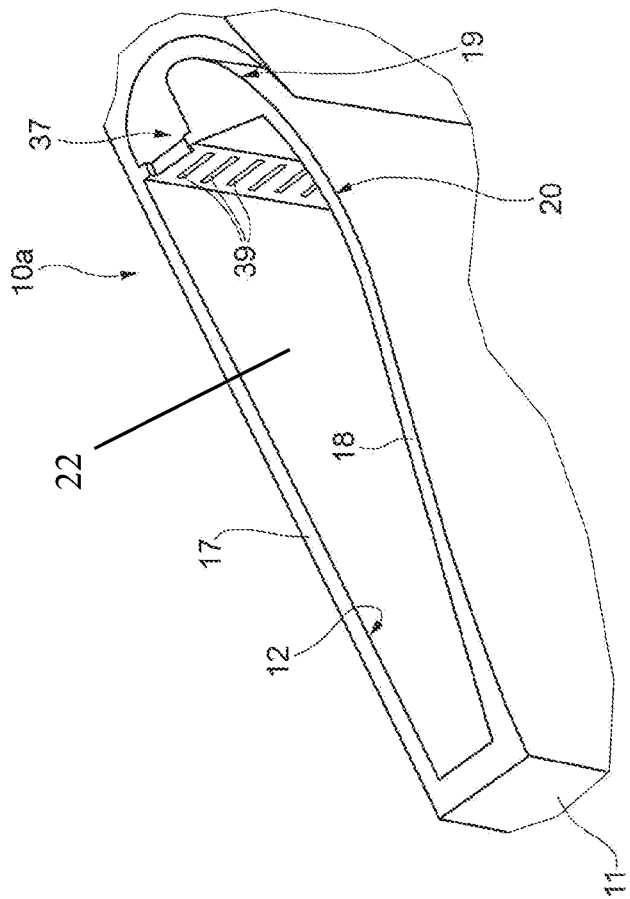
FIG. 3 illustrates in an enlarged view and in cross-section some details of the fan in FIGS. 1 and 2.
Figure 2:
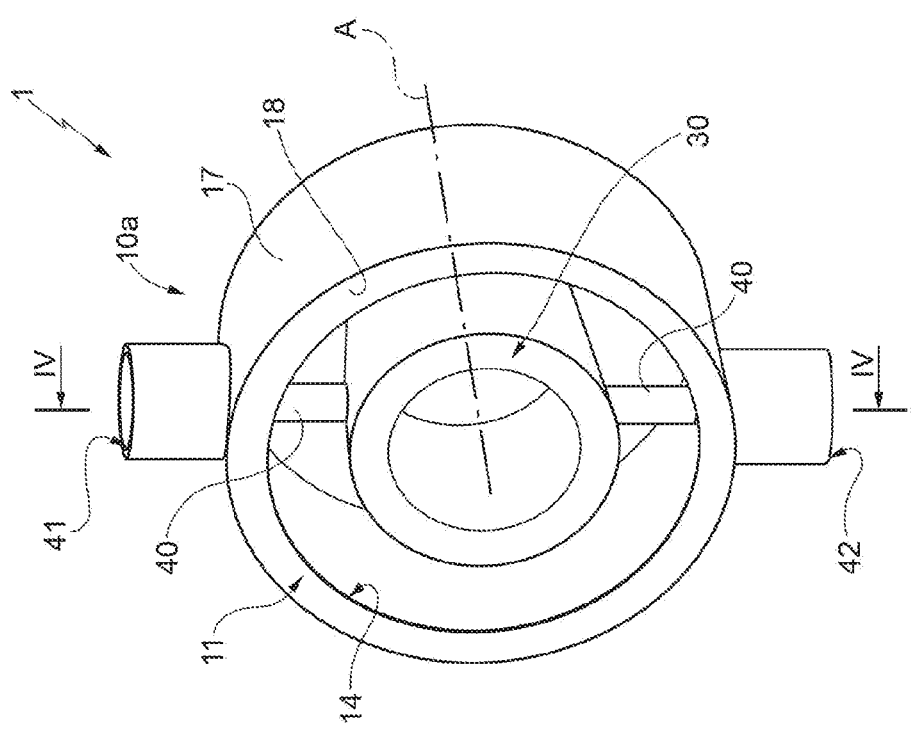
FIG. 2 is a perspective view of the fan in FIG. 1.
Figure 4:
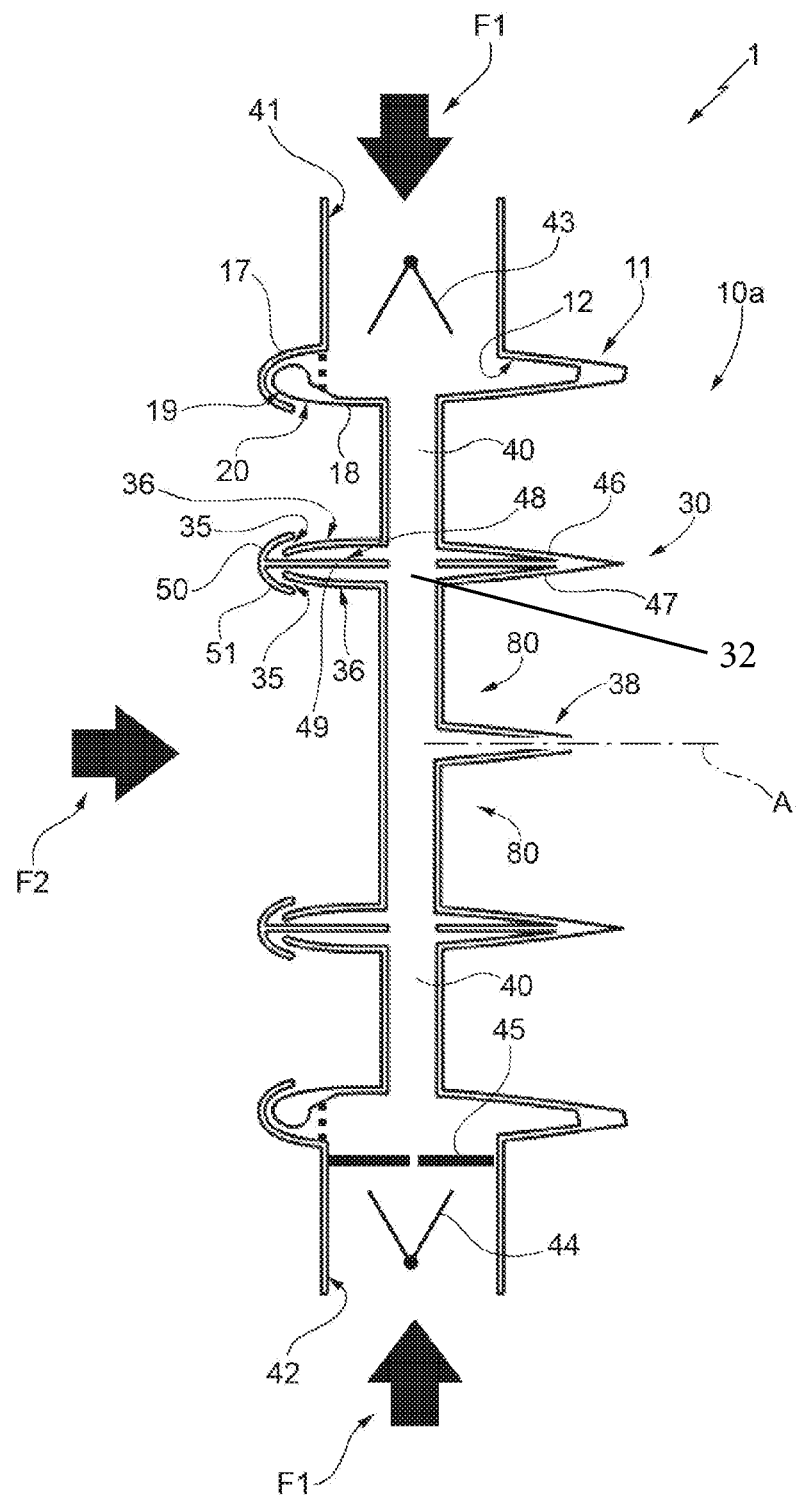
FIG. 4 is a cross-section along line IV-IV in FIG. 2 of the fan in FIGS. 2 and 3.

With reference to FIG. 1, reference numeral 1 denotes a vehicle.

The term 'vehicle' is understood, in the present description, to mean any self-propelled machine, in particular a land, air, marine vehicle.

Preferably, the vehicle 1 is an aircraft, a helicopter in the case illustrated.

The helicopter 1 essentially comprises a fuselage 2, a main rotor 3 arranged above the fuselage 2 and a tail rotor 5.

The fuselage 2 comprises, on opposite sides, a nose 6 and a tail boom 4 supporting the tail rotor 5.

The helicopter 1 further comprises,
a plurality of fans 10a, 10b, 10c, 10d, 10e, 10f, 10g, 10h of the bladeless type (FIGS. 2 to 8); and
one or more sources suitable to supply the fans 10a, 10b, 10c, 10d, 10e, 10f, 10g, 10h with respective primary air flows F1.

As described in more detail below in the present description, the operation of each fan 10a, 10b, 10c, 10d, 10e, 10f, 10g, 10h determines the suction of a secondary flow F2 from a respective suction environment 15.

The fan 10a, 10b, 10c, 10d, 10e, 10f, 10g, 10h also sends the primary and secondary flows F1, F2 to a respective delivery environment 16.

The fans 10a, 10b, 10c, 10d, 10e, 10f, 10g, 10h being identical to each other, hereinafter in the present description only one fan 10a, 10b, 10c, 10d, 10e, 10f, 10g, 10h is described.

In more detail, the fan 10a, 10b, 10c, 10d, 10e, 10f, 10g, 10h extends around an axis A.

The fan 10a, 10b, 10c, 10d, 10e, 10f, 10g, 10h substantially comprises:
a conveying duct 11 extending in an annular manner about the axis A and defining therein a passage 12 for the primary flow F1; and
a pair of ports 41, 42 extending radially, suitable to fluidly connect the conveying duct 11 with one or more primary flow sources F1 distinct from said fan 10a, 10b, 10c, 10d, 10e, 10f, 10g, 10h.

The conveying duct 11 further defines an annular opening 14 relative to the axis A.

The opening 14 separates the suction environment 15 of the fan 10 from the delivery environment 16 of said fan 10.

In particular, the environments 15, 16 are distinct from each other.

Preferably, the environments 15, 16 are arranged at different pressure levels.

The conveying duct 11 comprises, in particular, a wall 17 and a wall 18, opposite each other.

The wall 17 has predominantly external radial extension with respect to the wall 18 and is bent back in a radially internal position to said wall 18 at the mouth 19.

The walls 17, 18 define between them an outlet mouth 19 of the conveying duct 11.

The mouth 19 is fluidly connected with the passage and the opening 14, so as to allow the exit of a first aliquot of the primary flow F1 from the passage 12 towards said opening 14.

The conveying duct 11 further comprises a Coanda surface 20 on which the mouth 19 accompanies the primary flow F1 in output from the passage 12.

The flow rate of the primary air flow F1 adheres to the surface 20 thanks to the Coanda effect and generates a depression at the surface 20, which causes a secondary air flow F2. The latter is entrained by the primary air flow F1 through the opening 15 and towards the delivery environment 16.

In the case illustrated, the Coanda surface 20 is defined by the wall 18.

Preferably, the walls 17, 18 are parallel to each other at the mouth 19.

In other words, the thickness of the mouth 19 is substantially constant.

The fan 10a, 10b, 10c, 10d, 10e, 10f, 10g comprises a further annular conveying duct 30, fluidly connected with the conveying duct 11 and defining therein a passage 32 for a further aliquot of the primary flow F1; the conveying duct 30 comprises, in turn:
a pair of mouths 35 fluidly connected with the passage 32, so as to convey the further aliquot of the primary flow F1 from the passage 12 to the opening 14; and
a pair of Coanda surfaces 36, on which the mouth directs the primary flow F1 in output from the passage 12.

Conveying duct 30 extends in annular manner about axis A.

The flow rate of the primary air flow F1 generates a depression at the surface 36, which causes a secondary air flow F2, which is entrained by the primary air flow F1 through the opening 15 and towards the delivery environment 16.

In more detail, the fan 10a, 10b, 10c, 10d, 10e, 10f, 10g, 10h comprises a pair of radial ducts 40, which are interposed between the conveying ducts 12, 30.

More precisely, the ducts 40 are fluidly connected with the passages 12, 32 of the conveying ducts 11, 30.

In the present case, the ducts 40 fully define the wall 18.

The conveying duct 30 comprises, in particular (FIG. 3):
a radially outer wall 46;
a radially inner wall 47; and
a wall 48 formed by an axial section 49 interposed between the walls 46, 47 and a pair of walls 50, 51 respectively radially inner and outer, curved and protruding from the wall 47.

In the case illustrated, the wall 46 is connected, in particular integral with, the ducts 40.

The mouths 35 are defined one by the wall 46 and by the wall 50 and the other by the wall 47 and the wall 51.

The Coanda surfaces 36 are defined by the walls 46, 47.

In more detail, the conveying duct 30 is coaxial to the conveying duct 11 and is surrounded by said conveying duct 11.

The conveying duct 30 further comprises a nozzle 38 fluidly connected with the passages 12, 32 and arranged inside the opening 14 coaxially to the axis A.

More particularly, the nozzle 38 is arranged radially inwards of the conveying duct 30.

Nozzle 38 is on axis A.

In the embodiment shown, nozzle 38 is a non-Coanda nozzle.

Furthermore, conveying duct 30 comprises a pair of radial ducts 80, which are arranged on respective opposite radial sides of nozzle 38.

Each duct 80 is in fluid connection with a respective duct 40 and respective mouths 35 on one radial end thereof and with nozzle 38 on the other end thereof.

Advantageously, nozzle 38 ejects a quantitatively residual aliquot of primary flow F1 flowing into passage 32 directly in a direction parallel to axis A. In one embodiment, nozzle 38 ejects only the residual aliquot of primary flow F1, without ejecting secondary air flow F2.

In the embodiment shown, nozzle 38 is converging with respect to an advancing direction of the quantitatively residual aliquot of said primary flow F1 through it.

Preferably, each conveying duct 11, 30 comprises (FIG. 3) a wall 37 arranged inside the respective passage 22, 32.

In particular, each wall 37 extends perpendicular to the axis A, annular of axis A and is provided with a plurality of openings 39 equi-spaced radially to axis A.

The wall 37 of the conveying duct 11 is interposed between the walls 17, 18.

The wall 37 of the conveying duct 30 is interposed between the section 49 and the wall 46, and between the section 49 and the wall 47.

The openings 39 are suitable to reduce as much as possible, upstream of the respective mouths 19, 35, the level of turbulence of the primary flow F1 due to movement inside the conveying ducts 11, 30.

In the case illustrated, the openings 39 are quadrilateral, or polygonal, or circular in shape.

In greater detail, the conveying ducts 11, 30 are shaped as symmetrical aerodynamic profiles preferably having an attachment angle between 0 and 20 degrees.

Preferably, the fan 10a, 10b, 10c, 10d, 10e, 10f, 10g, 10h comprises a pair of non-return valves 43, 44 arranged along the ports 41, 42 and suitable to prevent the unwanted return of the primary flow F1 towards the sources of said primary flow F1.

Preferably, the fan 10a, 10b, 10c, 10d, 10e, 10f, 10g, 10h comprises a septum 45 arranged along one of the ports 41, 42 and suitable to generate a localized pressure drop along the respective port 41, 42. This septum 45 is convenient if the relative port 41, 42 is fluidly connected to a high pressure source.

The opening 14 has a circular crown shape.

Figure 5:
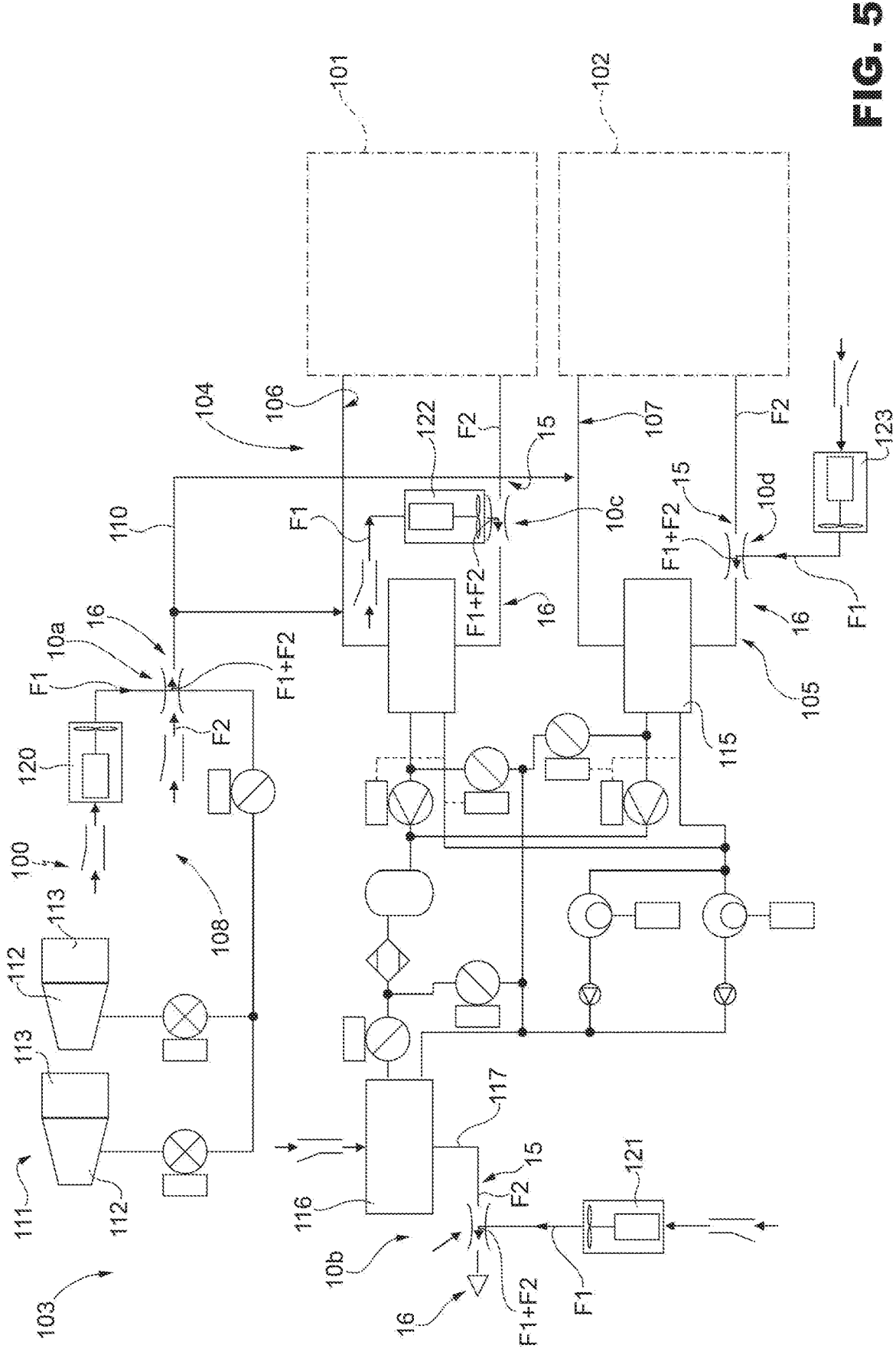
FIG. 5 is a diagram of a cabin air conditioning system and a passenger compartment for a vehicle comprising the fan in FIGS. 2 to 4.

With reference to FIG. 5, a conditioning system 100 of a cabin 101 and a cockpit 102 of a helicopter 1 is schematically illustrated.

The system 100 is per se known and is described to the extent necessary for the understanding of the present invention.

The system 100 substantially comprises:
a hot air generating unit 103 for the cabin 101 and cockpit 102;
a refrigerator unit 104 thermally coupled with the cabin 101;
a refrigerator group 105 thermally coupled with the cockpit 102;
a circuit 106 defining a continuous air circulation with the cabin 101, thermally coupled with the unit 104 and fluidly connected with the unit 103; and
a circuit 107 defining a continuous air circulation with the cockpit 102, thermally coupled with the unit 105 and fluidly connected with the unit 103.

The group 103 essentially comprises a fluid line 110, which can be supplied with an air flow that can be tapped from an engine system 111 of the helicopter 1.

In particular, the engine system 111 comprises a pair of turbo-gas groups each formed essentially of a compressor 112 and a turbine 113. The fluid line 110 is fluidly connected with the compressor 112.

The fan 10a is interposed along the fluid line 110 so as to supply the primary and secondary flows F1, F2 towards the groups 104, 105.

More precisely, the suction environment 15 of the primary flow of the fan 10a is an external environment 108 and the delivery environment 16 of the fan 10b is the fluid line 110.

The system 100 further comprises a fan 120 fluidly connected with the conveying duct 11 of the fan 10a and suitable to define the source of the primary flow F1.

The fan 120 aspirates the primary flow F1 from the external environment 108.

The groups 104, 105 define a closed circuit 120 crossed by a refrigerating fluid designed to describe a thermodynamic cycle known as a steam compression cycle.

In extreme synthesis, the groups 104, 105 comprise:
a fluid line 117 crossed by air extracted from the external environment 108;
a pair of respective evaporators 114, 115 interposed along respective circuits 106, 107 and suitable to remove heat from the air crossing said circuit 106, 107 and designed to be re-introduced into the cabin 101 and the cockpit 102 respectively; and
a common condenser 116 defining a heat exchanger thermally coupled with the fluid line 117.

More particularly, the refrigerant fluid evaporates inside the evaporators 114, 115 and condenses inside the condenser 116.

The air stream flowing along the fluid line 117 cools the condenser 116, thereby facilitating the condensation of the refrigerant fluid inside the condenser 116 and the thermodynamic efficiency of the cycle performed by the refrigerant fluid.

Conveniently, the system 100 comprises:
a fan 10b interposed along the fluid line 117 and having the respective opening 14 crossed by the fluid line 117;
a fan 10c interposed along the circuit 106 in a position interposed between the cabin 101 and the evaporator 114; and
a fan 10d interposed along the circuit 107 in a position interposed between the cockpit 102 and the evaporator 115.

In other words, the fluid line 117, the circuit 106 and the circuit 107 define the suction environments 15 of the secondary flow F2 of the respective fans 10b, 10c, 10d and the delivery environments 16 of the primary flow F1 and the secondary flow F2 of the respective fans 10b, 10c, 10d.

The system 100 comprises, a plurality of fans 121, 122, 123 fluidly connected respectively with the passages 12 of respective fans 10b, 10c, 10d.

The fans 121, 122, 123 define the primary flow source F1 for the respective fans 10b, 10c, 10d.

The fans 121, 122, 123 aspirate the primary flow F1 from the external environment 108.

Figure 6:
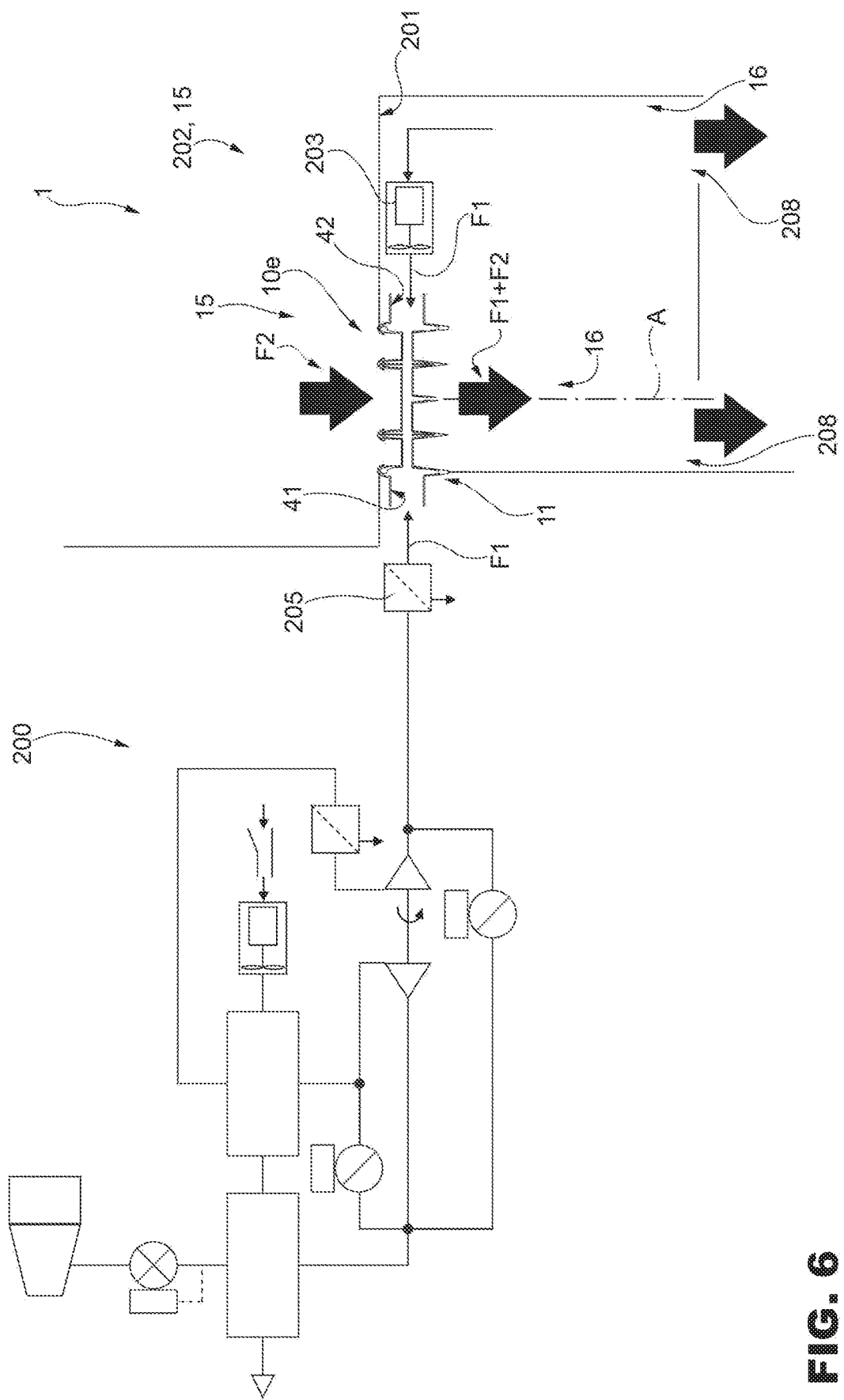
FIG. 6 is a diagram of an avionic bay cooling system for a vehicle comprising the fan in FIGS. 2 to 4 and an air cycle cooling unit.

With reference to FIG. 6, a cooling system 200 of an avionic bay 201 i.e. an area where the electronic equipment installed in the helicopter 1 is located, and comprising a fan 10e, is schematically illustrated.

In particular, the system 200 operates via an air cycle, in itself known and described only with reference to an optional air/water separator 205 powered by said system 200.

The system 200 further comprises a fan 203.

The fan 203 and, preferably, the air/water separator 205 are fluidly connected with the ports 41, 42 and define the primary flow sources F1 for the fan 10e.

In greater detail, the suction environment 15 of the secondary flow F2 of the fan 10e is defined by the environment 202 outside the helicopter 1 and the delivery environment 16 of the primary and secondary flows F1, F2 of the fan 10 is defined by said avionic bay 201.

The avionic bay 201 is, in turn, fluidly connected with the environment 202 by means of a plurality of openings 208, two in the case illustrated.

Figure 7:
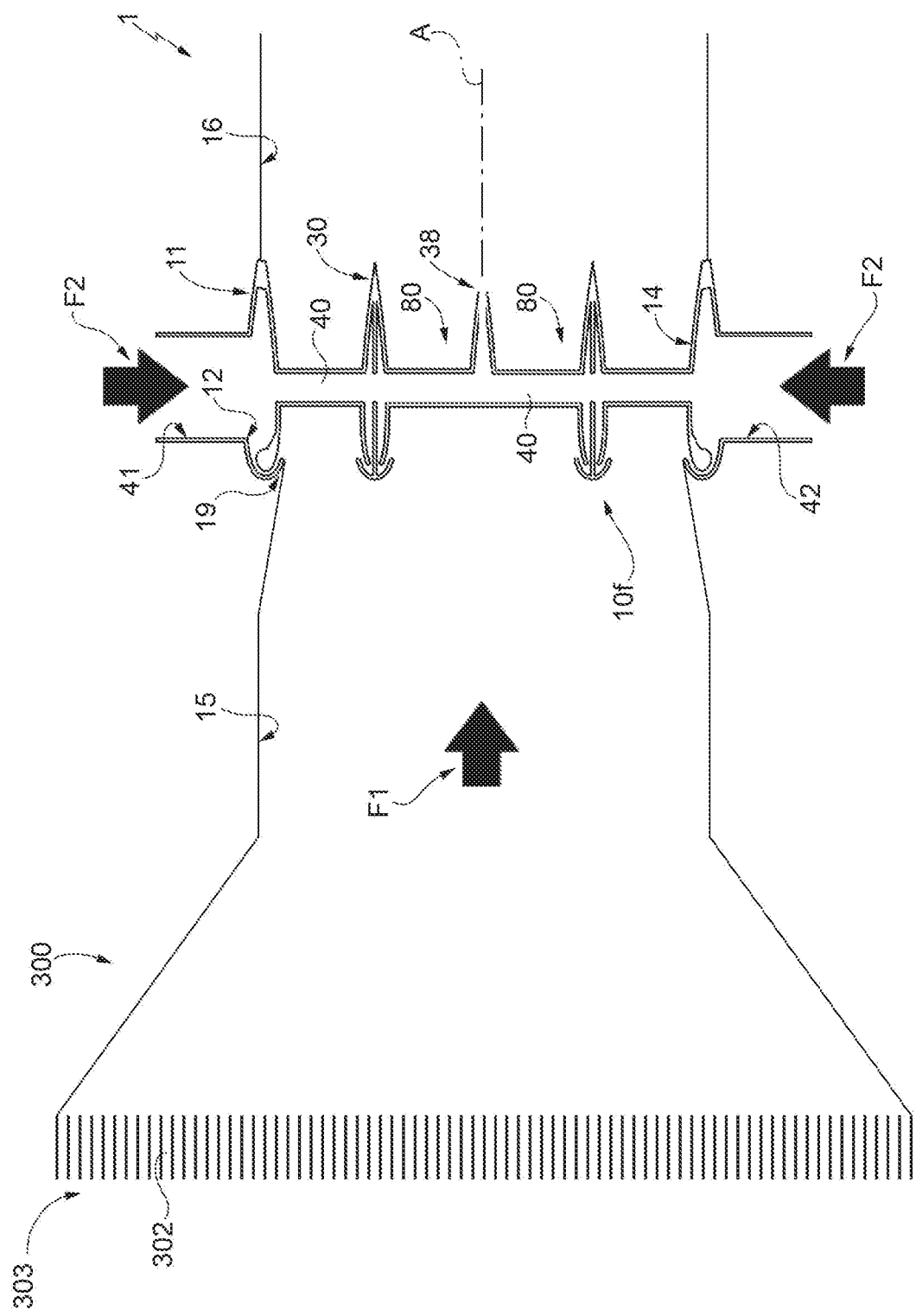
FIG. 7 is a diagram of a system comprising a heat exchanger and the fan in FIGS. 2 to 4.

FIG. 7 schematically illustrates a tapered duct 300 installed in the helicopter 1 and arranged downstream of a concentrated pressure drop 302 such as a heat exchanger or air filter 303, or an electric air heater for supplying hot air to the compartments 101 and 102 should it not be convenient to use the hot air from the engine.

The fan 10f is mounted along the duct 300 so that the opening 14 is coaxial to said duct 300.

The primary flow source F1 is an additional fan not shown but entirely similar to the fan 120, 121, 122, 123 and/or an air/water separator entirely similar to the separator 205 and not illustrated.

In particular, the fan 10f could be installed together with the duct 300 instead of the fans 10a, 10b, 10c, 10d, 10e inside the system 100 or system 200.

The secondary flow F2 is aspirated by the duct 300 in an interposed position between the heat exchanger 302 and the fan 10f, and both primary and secondary flows F1, F2 are sent to the delivery environment 16 defined by said duct 300 on the side of the fan 10 opposite the heat exchanger 302.

In other words, the duct 300 defines the aspiration and delivery environments 15, 16 of the fan 10f.

Figure 8:
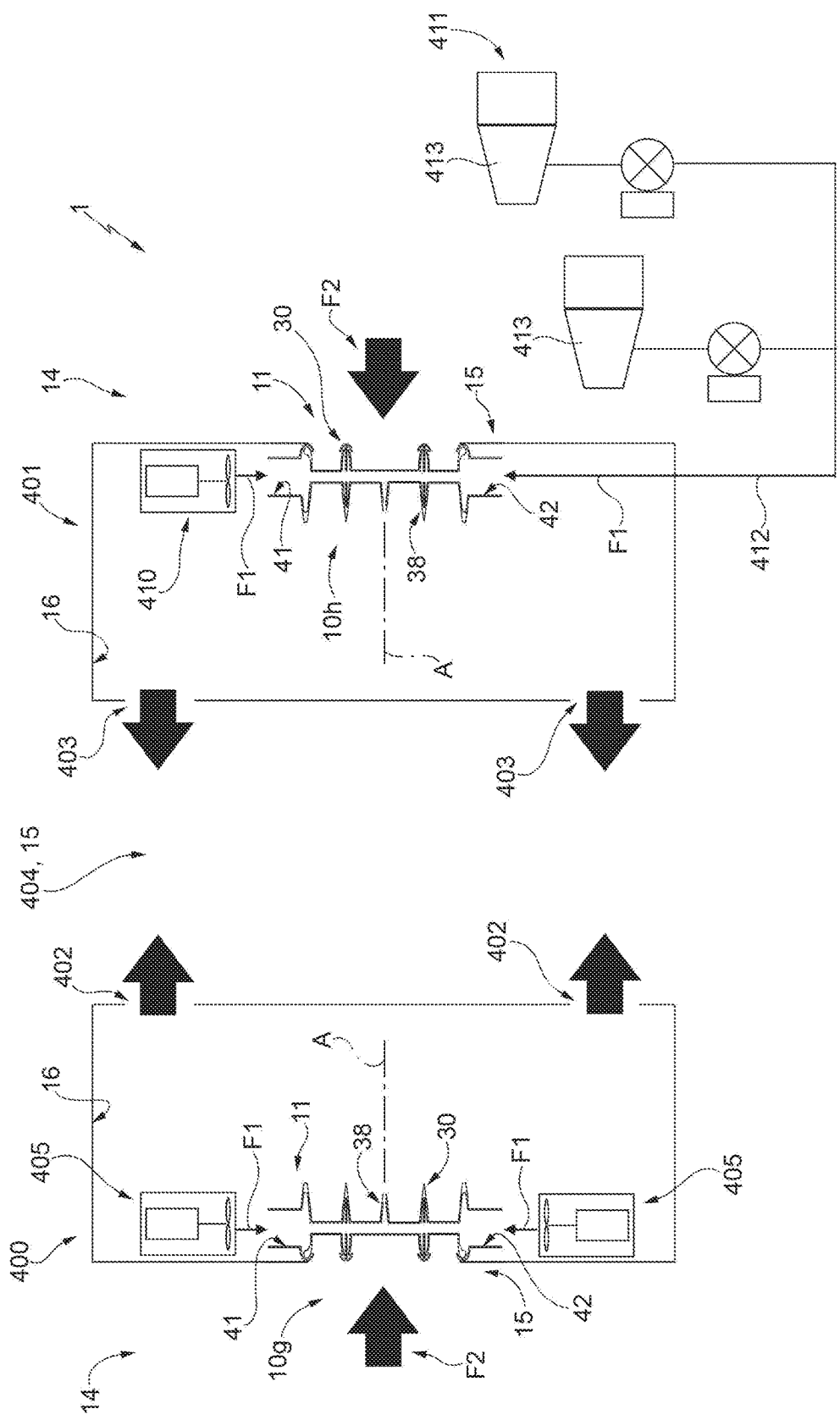
FIG. 8 is a diagram of a system comprising a pair of avionic bays and a pair of fans in FIGS. 2 to 4, one of which is fluidly connected with an air bleeding line from a compressor of a turbogas system of a vehicle.

FIG. 8 schematically illustrates a pair of avionic bays 400, 401 of a helicopter 1.

In particular, the avionic bays 400, 401 are fluidly connected via respective openings 402, 403 with an external environment 404.

The helicopter 1 further comprises:
a first fan 10g suitable to cool the avionic bay 400; and
a pair of fans 405 fluidly connected with the passage 12 of the conveying duct 11 and designed to define respective sources of the primary flow F1 for fan 10g.

The suction environment 14 of the secondary flow F2 fan 10g is defined by the external environment 404. The supply environment 15 of the primary F1 and secondary F2 flows of the fan 10g is defined by the avionic bay 400.

The helicopter 1 further comprises:
a fan 10h suitable to cool the avionic bay 401;
a fan 410 fluidly connected with the passage 12 of the conveying duct 11 of the fan 10g and designed to define a first primary flow source F1 for the fan 10h;
an engine system 411, in particular a turbo-gas system; and
a fluid line 412 fluidly connected with the motor system 411 and passage 12 of the fan 10h, and suitable to convey the primary flow F1 inside the passage 12 of the conveying duct 11 of the fan 10h.

The suction environment 14 of the secondary flow F2 of the fan 10h is defined by the external environment 404. The supply environment 15 of the primary and secondary flows F1, F2 of the fan 10h is defined by the avionic bay 401.

The engine system 411 defines the pressurised air source for the fan 10h.

In the case illustrated, the fluid line 412 is fluidly connected with a compressor 413 of the engine system 411 and is suitable to convey a flow of air tapped from the compressor 413 towards the passage 12 of the conveying duct 11 of the fan 10h.

It is important to note that the fan 10f could be installed together with the duct 300 instead of the fans 10g, 10h in order to cool the avionic bays 400, 401.

During operation of the helicopter 1, the external and distinct compressed air source(s) to the fan 10a, 10b, 10c, 10d, 10e, 10f, 10g, 10h supply the primary flow F1 into the passage 12 through the ports 41, 42.

The non-return valves 43, 44 arranged inside respective ports 41, 42 prevent the unwanted return of the primary flow F1 towards the source or sources.

In the event that the source makes the high pressure current available, the septum 45 generates a localized pressure drop that returns the pressure inside the passage 12 of the conveying duct 11 to an optimal value for the operation of the fan 10a, 10b, 10c, 10d, 10e, 10f, 10g, 10h.

The primary flow F1 flows into the passage 12, interacts with the wing profile defined by the duct 10a, 10b, 10c, 10d, 10e, 10f, 10g, 10h and crosses the openings 39 of the wall 37. The openings 39 reduce as much as possible, upstream of the mouth 19, the level of turbulence of the primary air stream caused by the movement thereof inside the passage 12, so as to reduce the overall noise and vibrations of the fan 10a, 10b, 10c, 10d, 10e, 10f, 10g, 10h.

Below, a first aliquot of the primary flow F1 crosses a narrow section at the mouth 19 and comes out of the mouth 19 outside the passage 12.

The source(s) continue to supply the primary flow F1 of compressed air inside the passage 12.

The first aliquot of the primary flow F1 tends to adhere to the surface 20. Thus, by Coanda effect, a depression is generated at the surface 20 and, consequently, an amplification of the air stream flow rate of the primary flow F1.

This first aliquot of the primary flow F1 entrains a secondary flow F2 through the opening 14, particularly from the regions surrounding the edge of the opening 14.

In addition, a second aliquot of the primary flow F1 conveyed into the passage 12 flows along the ducts 40 and reaches the passage 32 of the conveying duct 30.

This second aliquot of the primary flow F1 flows into the passage 32, interacts with the wing profile defined by the conveying duct 30, crosses the openings 39 of the wall 37, and is directed from the mouths 35 towards the respective Coanda surfaces 36.

The depression generated at the Coanda surface 36 generates an additional amplified primary aliquot of primary flow F1 through the opening 14 and further amplification of the secondary flow rate F2.

The nozzle 38 makes it possible to eject a quantitatively residual aliquot of the primary flow F1 flowing into the passage 32 directly in a direction parallel to the axis A.

In particular, the residual aliquot flow through ducts 80 towards nozzle 38.

With reference to FIG. 5, the fan 10a supplies the primary and secondary air flows F1, F2 along the fluid line 110 and towards the groups 104, 105.

The fan 120 defines the primary flow source F1 and supplies the compressed air stream into the port 41 of the passage 12 of the conveying duct 11 of the fan 10a.

The fan 10b provides the relative primary and secondary air flows F1, F2 along the fluid line 117.

The fan 10c provides the relative primary and secondary air flows F1, F2 along the circuit 106 in the position interposed between the cabin 101 and the evaporator 114.

The fan 10d provides the relative primary and secondary air flows F1, F2 along the circuit 107 in the position interposed between the cockpit 102 and the evaporator 115.

The fans 121, 122, 123 define respective primary flow sources F1 for the ports 41, 42 of the conveying ducts 11 of fans 10b, 10c, 10d, respectively.

With reference to FIG. 6, the fan 10e aspirates the secondary flow F2 from the environment 202 outside the helicopter 1 and sends the primary and secondary flows F1, F2 into the environment 16 defined by the avionic bay 201, cooling said avionic bay 201.

In other words, the external environment 202 defines the suction environment 15 of the secondary flow F2 of the fan 10g.

The fan 203 and preferably the air/water separator 205 supply respective aliquots of the primary flow F1 into respective ports 41, 42 of the conveying duct 11 of the fan 10e.

With reference to FIG. 7, the fan 10f aspirates the secondary flow F2 from the region of the duct 300 interposed between the heat exchanger 302 and said fan 10f. This region defines the suction environment 15 of the fan 10f.

The fan 10f also supplies the primary and secondary flows F1, F2 to the defined environment 16, to the region of the duct 300 arranged on the opposite side of the fan 10 with respect to the heat exchanger 302.

The primary flow sources F1—represented by the additional fan not illustrated and entirely similar to the fan 120, 121, 122, 123 and/or the additional air/water separator not illustrated entirely similar to the separator 205—supply respective aliquots of the primary flow F1 to respective ports 41, 42 of the conveying duct 11 of said fan 10f.

With reference to FIG. 8, the fan 10g and the fan 10h are used to cool the avionic bays 400, 401, respectively.

In more detail, with reference to the first fan 10h, the fans 405 define the primary flow sources F1 for the ports 41, 42, and the fan 10g aspirates the secondary flow F2 from the environment 404 and delivers the primary F1 and secondary F2 flows towards the avionic bay 401.

The environment 404 and the avionic bay 401 therefore define the suction environment 15 and the delivery environment 16 of the fan 10g.

With reference to the second fan 10h, the fan 410 and the fluid line 412 define the sources of the primary flow F1 for the ports 41, 42, and the second fan 10h aspirates the secondary flow F2 from the environment 404 and sends the primary F1 and secondary F2 flows towards the avionic bay 402.

The environment 404 and the avionic bay 402 therefore define the suction environment 15 and the delivery environment 16 of the fan 10h.

From an examination of the helicopter 1 made according to the present invention, the advantages which it makes it possible to obtain are evident.

In particular, the fan 10a, 10b, 10c, 10d, 10e, 10f, 10g 10h comprises a further annular conveying duct 30, fluidly connected with the conveying duct 11 and defining therein a passage 32 for a further aliquot of the primary flow F1.

The conveying duct 30 comprises, in turn:
  a pair of mouths 35 fluidly connected with the passage 32, so as to convey the additional aliquot of the primary flow F1 from the passage 32 to the opening 14; and
  a pair of Coanda surfaces 36, onto which the mouth 35 directs the aliquot of primary flow F1 in output from the passage 32.

The Applicant has noted that in this way it is possible to raise the head of the fan 10a, 10b, 10c, 10d, 10e, 10f, 10g, 10h. In other words, thanks to the presence of the additional conveying duct 30, the fan 10a, 10b, 10c, 10d, 10e, 10f, 10g, 10h is able to convey the primary and secondary flows F1, F2 between suction and delivery environments 15, 16 arranged at different pressure values.

This makes it possible to effectively apply the fan 10a, 10b, 10c, 10d, 10e, 10f, 10g, 10h in operational configurations, such as those occurring on board the helicopter 1. In such configurations, the primary flow source F1 aspirates from an environment other than the delivery environment 16 and/or arranged at a different pressure from said delivery environment 16, unlike what is described in the prior solutions and identified in the introductory part of the present description.

Nozzle 38 makes it possible to eject a quantitatively residual aliquot of the primary flow F1 flowing into the passage 32 directly in a direction parallel to the axis A.

The conveying ducts 11, 30 comprise a plurality of openings 39 arranged inside the respective passages 12, 32 and crossed by the primary flow F1 upstream of the mouth 19, 35, with reference to the advancement path of the primary flow F1 itself.

The openings 39 reduce as much as possible, upstream of the mouth 19, the level of turbulence of the primary flow F1 caused by the movement thereof inside the passage 12, 32, so as to reduce the noise and overall vibrations of the fan 10.

The non-return valves 43, 44 arranged inside respective ports 41, 42 prevent the unwanted return of the primary flow F1 towards the source or sources.

In the event that the source makes the high pressure current available, the septum 45 generates a localized pressure drop that returns the pressure inside the passage 12 of the duct to an optimal value for the operation of the fan 10a, 10b, 10c, 10d, 10e, 10f, 10g, 10h.

The source(s) of the primary flow F1 is/are distinct from the fan 10a, 10b, 10c, 10d, 10e, 10f, 10g, 10h.

Thanks to this and the fact that it has a greater head than the prior solutions, the fan 10a, 10b, 10c, 10d, 10e, 10f, 10g, 10h can be effectively used in aircraft 1 to replace traditional fans and jet pumps.

This reduces the risk of failure associated with the use of traditional fans. Such failures could result in the loss of components and which could have a direct impact on the flight safety of the aircraft 1, due to damage to said aircraft equipment 1, or overheating of the ventilated electronic equipment.

The use of the fan 10a, 10b, 10c, 10d, 10e, 10f, 10g, 10h in the aircraft 1 instead of the commonly used jet pumps also reduces noise level and increases thermodynamic efficiency, with obvious advantages in terms of passenger comfort, increased payload of the aircraft 1 and reduced pollution levels generated by said aircraft 1.

Lastly, it is clear that modifications and variants may be made to the fan 10a, 10b, 10c, 10d, 10e, 10f, 10g, 10h and to the claimed helicopter 1 while remaining within the scope of protection of the present invention.

In particular, the fan 10a, 10b, 10c, 10d, 10e, 10f, 10g, 10h could comprise a plurality of coaxial conveying ducts 30 fluidly connected to each other and fluidly connected with the conveying duct 11.

The helicopter 1 could be an aircraft, a convertiplane or a gyrodyne or any other aircraft, naval or railway vehicle and more generally any moving object.

The invention claimed is:
1. A fan (10a, 10b, 10c, 10d, 10e, 10f, 10g, 10h) comprising:

a first annular conveying element (11), fluidly connectable with a source (120, 121, 122, 123, 203, 205 405, 410, 412) of a primary air flow (F1) and defining therein a first passage (12) for said primary air flow (F1);

a first mouth (19) receiving, in use, a first aliquot of said primary air flow (F1) from said first passage (12);

a first Coanda surface (20) on which said first mouth (19) directs, in use, said first aliquot of said primary air flow (F1);

a first opening (14) fluidly connected with said first mouth (19) and crossable, in use, by said first aliquot of said primary air flow (F1) coming out of said first mouth (19) and by a secondary air flow (F2) drawn by said primary air flow (F1); and a second annular conveying element (30), fluidly connected with said first annular conveying element (11) and defining therein a second passage (32) for a second aliquot of said primary air flow (F1);

said second annular conveying element (30) comprising, in turn:

at least one second mouth receiving (35), in use, said second aliquot of said primary air flow (F1) from said second passage (32) and fluidly connected with said opening (14); and at least a second Coanda surface (36) onto which said second mouth (35) directs, in use, said second aliquot of said primary air flow (F1);

said fan (10a, 10b, 10c, 10d, 10e, 10f, 10g, 10h) further comprising at least one duct (40) fluidly connected with said first annular conveying element (11) and said second annular conveying element (30), arranged radially with respect to said first annular conveying element (11) and said second annular conveying element (30), said second annular conveying element (30) further including a pair of further radial ducts (80) which are in fluid connection with a nozzle (38) and are arranged on respective opposite radial sides of said nozzle (38) with respect to an axis (A) of said fan (10a, 10b, 10c, 10d, 10e, 10f, 10g, 10h); said fan (10a, 10b, 10c, 10d, 10e, 10f, 10g, 10h) having an outlet for said second aliquot of said primary flow (F1);

said nozzle (38) being coaxial to said first annular conveying element (11) and said second annular conveying element (30) and radially inward of said second annular conveying element (30);

wherein said second annular conveying element (30) comprises a pair of said second mouths (35) and a pair of said second Coanda surfaces (36) facing respectively towards said first annular conveying element (11) and towards said second annular conveying element (30)

said nozzle (38) making it possible to eject, in use, a residual aliquot of said primary flow (F1) flowing into said second passage (32) directly in a direction parallel to said axis (A) of said fan (10a, 10b, 10c, 10d, 10e, 10f, 10g, 10h).

2. The fan according to claim 1, wherein said second annular conveying element (30) is coaxial to said first annular conveying element (11).

3. The fan according to claim 1, wherein said second annular conveying element (30) is surrounded by said first annular conveying element (11).

4. The fan according to claim 1, wherein at least one of said first annular conveying element (11) and said second annular conveying element elements (30) comprises a plurality of second openings (39);

said second openings (39) being crossable respectively by said first aliquot and second aliquot of said primary flow (F1) upstream of the respective first mouth (19) and said pair of second mouths (35) and being suitable to reduce the vorticity of fluid trickles respectively of said first aliquot and second aliquot of said primary flow (F1).

5. The fan according to claim 1, wherein said first mouth (19) is delimited by a first wall (17) and a second wall (18) opposite each other and extending at a constant distance; said second wall (18) further defining said first Coanda surface (20) downstream of said first mouth (19).

6. The fan according to claim 1, further comprising pair of ports (41, 42) fluidly connected with said first passage (12) of said first annular conveying element (11) and fluidly connectable with respective sources (120, 121, 122, 123, 203, 405, 410, 412) of current external to said fan (10a, 10b, 10c, 10d, 10e, 10f, 10g, 10h).

7. The fan according to claim 6, wherein at least one port of said pair of ports (41, 42) comprises:

a septum (45) defining a localized pressure drop; and/or one or more non-return valves (43, 44).

8. The fan according to claim 1, wherein at least respective portions of said first annular conveying element (11) and second annular conveying element (30) define respective aerodynamic profiles lapped by the primary air flow (F1), in use, inside said first and second passages (12, 32).

9. The fan according to claim 1, wherein said first annular conveying element (11) and said second annular conveying element (30) and said nozzle (38) annularly extend about said axis (A).

10. The fan according to claim 1, wherein said nozzle (38) is a non-Coanda nozzle.

11. The fan according to claim 1, wherein said nozzle (38) is converging, with respect to an advancing direction of said residual aliquot of said primary flow (F1) through the nozzle (38) itself.

12. The fan according to claim 1, wherein said further radial ducts (80) are in fluid communication with said second mouths (35).

13. An air, marine or land vehicle (1) comprising:

a fan (10a, 10b, 10c, 10d, 10e, 10f, 10g, 10h) according to claim 1;

a source (120, 121, 122, 123, 203, 205, 405, 410, 412) of pressurised air distinct from said fan (10a, 10b, 10c, 10d, 10e, 10f, 10g, 10h) and suitable to convey said primary flow (F1) from a first environment (108, 202, 200, 404) into said first annular conveying element (11);

a second environment (15) from which said fan (10a, 10b, 10c, 10d, 10e, 10f, 10g, 10h) aspirates said secondary air flow (F2); and a third environment (16) towards which said fan sends, in use, said primary air flow and said secondary air flow (F2);

said first (108, 202, 200, 404) and third environments (16) being distinct from each other.

14. The air, marine or land vehicle according to claim 13, wherein characterized in that said source (120, 121, 122, 123, 203, 405, 410, 412) of pressurised air is distinct from said fan (10a, 10b, 10c, 10d, 10e, 10f, 10g, 10h);

said source (120, 121, 122, 123, 203, 205, 405, 410, 412) being:

an additional fan (120, 121, 122, 123, 203, 405, 410); or a fluid line (412) fluidly connected with an engine system (411) of said vehicle (1) for tapping an operating fluid and fluidly connected with said first annular conveying element duct (11); or an air/water separator (205) of a cooling system (200) of an electronic bay (201).

15. The air, marine or land vehicle according to claim 13, wherein said second environment (15) is defined by one of:
- an external environment (108, 202, 404) outside said vehicle (1);
- a second fluid line (117) thermally coupled with a cooling system (104, 105) of a passenger compartment (102) or a cabin (101);
- a circuit (106, 107) fluidly connected with said passenger compartment (102) or said cabin (101) and suitable to allow a continuous circulation of air to and from said passenger compartment (102) or said cabin (101); and
- a duct (300) fluidly connected with a heat exchanger (302) of an air filter (303) of said vehicle (1); said third environment (16) being defined by one of:
- a third fluid line (110) fluidly connected with said passenger compartment (102) or said cabin (101) and suitable to allow a continuous circulation of air to and from said passenger compartment (102) or said cabin (101);
- from said external environment (108);
- an electronic bay (201, 400, 401); and
- a duct (300) fluidly connected with a heat exchanger (302) of an air filter (303) of said vehicle (1).

16. The air, marine or land vehicle according to claim 13, wherein the vehicle is a helicopter (1) or a convertiplane or a gyrodyne.

* * * * *